United States Patent
Williams et al.

(10) Patent No.: US 6,959,239 B2
(45) Date of Patent: Oct. 25, 2005

(54) TRANSMISSION AND TORQUE CONVERTER COOLING CONTROL

(75) Inventors: Bryan J. Williams, Farmington Hills, MI (US); Jeffrey R. Kelly, Whittaker, MI (US); David J. Varda, Ypsilanti, MI (US); Scott G. Shockley, Canton, MI (US)

(73) Assignee: General Motors Corporation, Detroit, MI (US)

( * ) Notice: Subject to any disclaimer, the term of this patent is extended or adjusted under 35 U.S.C. 154(b) by 46 days.

(21) Appl. No.: 10/786,832

(22) Filed: Feb. 25, 2004

(65) Prior Publication Data

US 2005/0187690 A1    Aug. 25, 2005

(51) Int. Cl.[7] ............................ G06F 7/00; F16H 59/72
(52) U.S. Cl. ............................ 701/55; 477/76; 477/98
(58) Field of Search ............................ 701/51, 55, 65; 477/97, 98, 76

(56) References Cited

U.S. PATENT DOCUMENTS

| | | | | | |
|---|---|---|---|---|---|
| 5,024,125 | A | * | 6/1991 | Baba | 477/98 |
| 5,050,717 | A | * | 9/1991 | Shibayama | 477/64 |
| 5,069,084 | A | * | 12/1991 | Matsuno et al. | 477/61 |
| 5,319,963 | A | * | 6/1994 | Benford | 73/118.1 |
| 5,556,349 | A | * | 9/1996 | Ishii et al. | 477/76 |
| 5,681,237 | A | * | 10/1997 | Furukawa et al. | 477/98 |
| 5,857,162 | A | * | 1/1999 | Vukovich et al. | 701/62 |
| 5,960,669 | A | * | 10/1999 | Ohashi et al. | 74/335 |
| 6,146,309 | A | * | 11/2000 | Nishino et al. | 477/98 |

* cited by examiner

*Primary Examiner*—Michael J. Zanelli
(74) *Attorney, Agent, or Firm*—Christopher DeVries

(57) ABSTRACT

A control system that generates one of a normal mode and a hot mode signal to control operation of a transmission includes a calculator that calculates a predicted temperature of a torque converter and a comparator that compares the predicted temperature to a threshold temperature. A timer generates one of the normal mode and the hot mode signals based on the predicted temperature and the threshold temperature.

51 Claims, 4 Drawing Sheets

TRANSMISSION AND TORQUE CONVERTER COOLING CONTROL

FIELD OF THE INVENTION

The present invention relates to transmissions and torque converters, and more particularly to a cooling control for a transmission and a torque converter.

BACKGROUND OF THE INVENTION

A torque converter is a fluid-coupling device that provides smooth transition of engine power to a transmission. A stator located in the torque converter multiplies torque by altering the direction of oil flow between a pump and a turbine. This change in direction increases the inertial fluid force on the pump assembly thereby increasing turbine torque. Since the stator reroutes the fluid and is located in the center of the fluid coupling flow, it receives a high amount of thermal energy, and therefore it is considered to be the hottest element within the torque converter.

Certain protections must be programmed into the transmission control to prevent overheating. In the event of a high-temperature condition, the transmission is operated in a hot mode to protect against overheating. Three traditional methods to diagnose the hot mode include: conventional, estimated stator and predictive sump. Using the conventional method, stator temperature threshold calibrations determine the hot mode entrance and exit criteria. The estimated stator method uses calibrations controlling the amount of time a transmission can maintain a certain speed ratio without exceeding temperature targets. The predictive sump method controls hot mode entry based upon the rate of change of the sump temperature.

Although these methods are effective in preventing the transmission from overheating, each retains certain disadvantages. The conventional method may only be used for limited applications because most transmission configurations exceed stator or cooler line temperature thresholds under minimum speed ratio testing. The predictive method is overly aggressive under high heat generation conditions, is inaccurate at low speeds and does not adequately protect the transmission under Driver Shift Control functionality. The predictive sump method must have a built in safety factor to account for the delay between the heat generation and rise in sump temperature. In addition, each of the above methods require a significant amount of time and resources for calibration.

SUMMARY OF THE INVENTION

Accordingly, the present invention provides a control system that generates one of a normal mode and a hot mode signal to control operation of a transmission. The control system includes a calculator that calculates a predicted temperature of a torque converter and a comparator that compares the predicted temperature to a threshold temperature. A timer generates one of the normal mode and the hot mode signals based on the predicted temperature and the threshold temperature.

In one feature, the hot mode signal is generated when the predicted temperature is greater than the threshold temperature for a threshold time.

In another feature, the normal mode signal is generated when the predicted temperature is lower than the threshold temperature for a threshold time.

In another feature, a controller operates the transmission to reduce slipping of the torque converter based on the hot mode signal.

In another feature, the calculator calculates the predicted temperature based on work loss through the torque converter, flow rate through the torque converter, a heat transfer coefficient for air and a heat transfer coefficient for oil flowing through the torque converter. The calculator calculates the work loss based on a speed ratio, an input torque into the torque converter and an output torque from the torque converter. The calculator calculates the speed ratio based on an engine speed signal and a transmission speed signal. The calculator calculates the input torque based on an engine speed signal and a K-factor. The K-factor is determined from a look-up table based on the speed ratio.

In another feature, the output torque is based on the input torque and a torque ratio. The torque ratio is determined from a look-up table based on the speed ratio.

In still another feature, the calculator determines the flow rate from a look-up table based on a line pressure signal and an engine speed signal.

In yet another feature, the calculator calculates the heat transfer coefficient of air based on a speed ratio and a locked state of a torque converter clutch.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
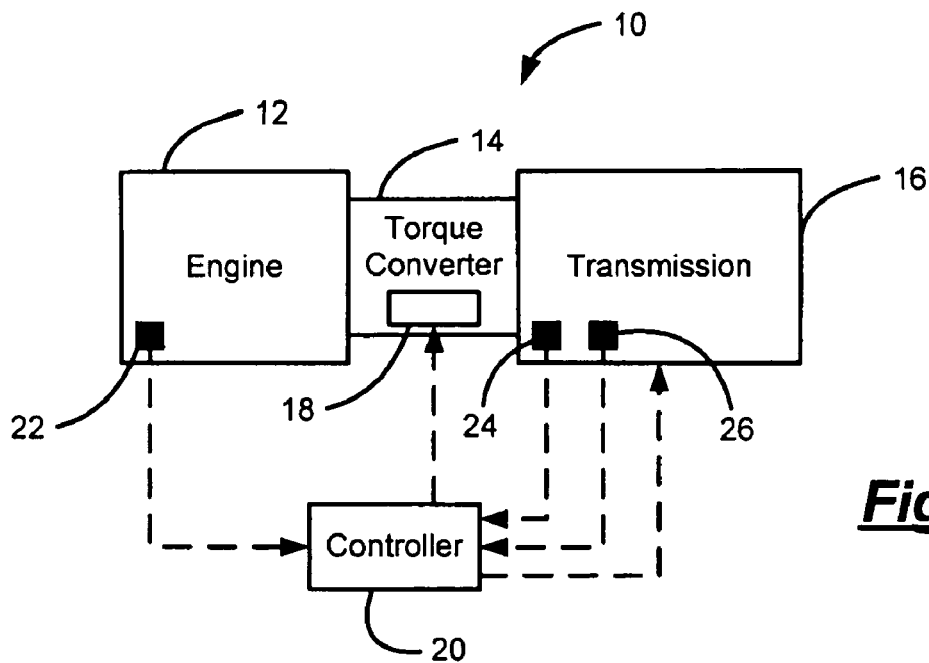
FIG. 1 is a functional block diagram of a vehicle having an automatic transmission that is driven by an engine through a torque converter.

The following description of the preferred embodiments is merely exemplary in nature and is in no way intended to limit the invention, its application, or uses. For purposes of clarity, the same reference numbers will be used in the drawings to identify similar elements.

Referring now to FIG. 1, a vehicle 10 is schematically illustrated. The vehicle 10 includes an engine 12, a torque converter 14 and a transmission 16. The engine 12 drives the transmission 16 through the torque converter 14. The torque converter 14 is a fluid coupling that enables the engine 12 to rotate almost independently of the transmission 16. When the engine 12 is turning slowly or idling, the amount of drive torque passed through the torque converter 14 to the transmission 16 is relatively small. Therefore, only light pressure on a brake pedal is required to keep the vehicle 10 from moving. As engine speed increases, more fluid is pumped through the torque converter, transferring more drive torque to the transmission 16.

The torque converter 14 includes a torque converter clutch (TCC) 18 that is operable in a locked and unlocked state. In the unlocked state, torque converter slip occurs within the torque converter 14 enabling drive torque multiplication to the transmission 16. In the locked state, the TCC 18 provides a direct drive coupling between the engine 12 and the transmission 16 and no drive torque multiplication occurs.

The transmission 16 is preferably an automatic transmission that transfers the drive torque from the engine 12 to wheels (not shown) through various gear ratios. The transmission 16 is hydraulically actuated to operate using a desired gear ratio. Hydraulic fluid pressure or line pressure actuates transmission components to enable shifting based on a shift logic. It is also anticipated that the transmission 16 can include driver shift control (DSC), whereby a driver can command gear shifts outside of the shift logic using a tap-up or tap-down input (not shown).

A controller 20 controls the overall operation of the vehicle 10 according to the cooling control of the present invention. An engine speed sensor 22 generates an engine speed signal that is received by the controller 20. A transmission speed sensor 24 and a transmissions line pressure sensor 26 respectively generate a transmission speed signal and a line pressure signal that are received by the controller 20. The transmission speed signal indicates the rotational speed of a transmission input shaft (not shown) and the line pressure signal indicates the hydraulic pressure at which the transmission 16 is being operated.

The controller 20 operates the vehicle 10 in either a normal mode or a hot mode based on temperature criteria, as discussed in further detail below. In the normal mode, the controller 20 controls transmission shifting based on the normal shift logic and allows DSC in the case of a transmission incorporating DSC. In the hot mode, the controller 20 modifies vehicle operation in order to cool the torque converter and transmission components. Vehicle operation can be modified in a number of manners, including, but not limited to, preventing downshift, operation using an alternative shift logic, reducing engine speed, preventing heavy downshifts or preventing $3^{rd}$ gear or $2^{nd}$ gear starts in the event of a transmission including DSC. Different hot mode strategies can be implemented based on the particular transmission 16 and torque converter 14.

Figure 2:
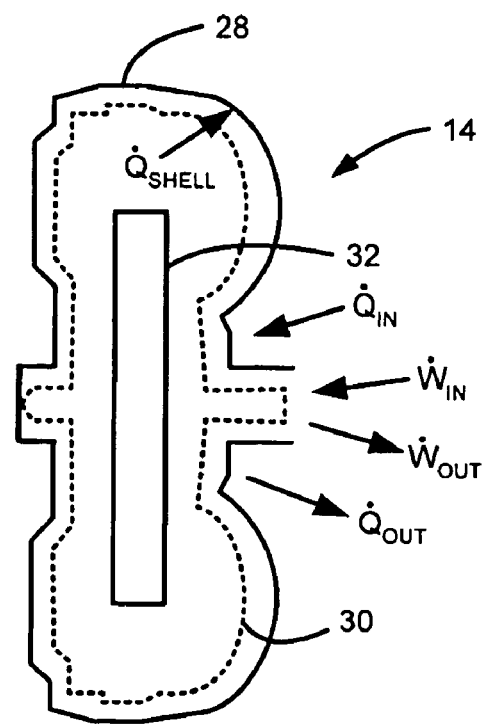
FIG. 2 is a schematic illustration of the torque converter depicting an energy balance between oil within the torque converter and a torque converter shell.
Figure 3:
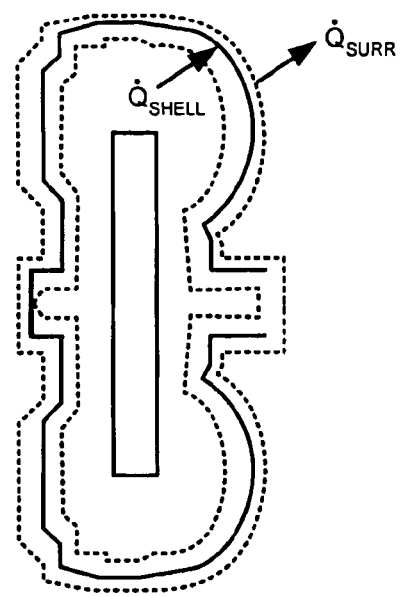
FIG. 3 is a schematic illustration of the torque converter depicting an energy balance between the torque converter shell and the atmosphere surrounding the torque converter.

Referring now to FIGS. 2 and 3, the torque converter 14 is a fluid-coupling device that provides smooth transition of engine power to the transmission 16. The torque converter 14 includes a shell 28 that retains a volume of oil 30 and a stator 32. The stator 32 multiplies torque by altering the direction of oil flow between a pump and a turbine (not shown). This change in direction increases the inertial fluid force on the pump assembly thereby increasing turbine torque. Since the stator 32 reroutes the fluid flow and sits in the center of the fluid coupling, it receives a high amount of thermal energy. Therefore, the stator 32 is considered to be the hottest element within the torque converter 14.

A math based thermal model is used to determine stator temperature. To quantify the amount of thermal energy the stator 32 is exposed to, an energy balance on the converter control volume of the oil 30 is provided according to the first law of thermodynamics as follows:

$$\dot{W}_{in} - \dot{W}_{out} + \dot{Q}_{in} - \dot{Q}_{out} - \dot{Q}_{shell} = \rho_{oil} V_{oil} cp_{oil} \frac{dT_{out}}{dt} \quad (1)$$

where:
$\rho_{oil}$ is the density of the oil;
$V_{oil}$ is the volume of the oil within the torque converter; and
$cp_{oil}$ is the specific heat of the oil.

Assuming transient conduction and uniform temperature gradients within the torque converter 14, the rate of stator temperature change $$\left(\frac{dT_{out}}{dt}\right)$$

is equal to the change in converter power, plus the change in oil flow energy, minus the energy losses to shell 28 of the torque converter 14.

Energy losses to the shell of the torque converter (e.g., to the steel) are calculated as:

$$\dot{Q}_{shell} = h_{oil} A (T_{out} - T_{shell}) \quad (2)$$

where:
$h_{oil}$ is the heat transfer coefficient of the oil; and
A is the shell surface area.

Thermal energy changes to the oil as it flows through torque converter 14 are calculated as:

$$\dot{Q}_{in} - Q_{out} = \dot{m}_{oil}(T_{in} - T_{out}) \quad (3)$$

where:
$\dot{m}_{oil}$ is the mass flow of oil.

Combining Equation 2 and Equation 3 with Equation 1, yields:

$$\Delta \dot{W} + \dot{m}_{oil} cp_{oil}(T_{in} - T_{out}) - h_{oil} A(T_{out} - T_{steel}) = \rho_{oil} V_{oil} cp_{oil} dT_{oil}/dt \quad (4)$$

By rearranging Equation 4, the following differential equation is provided:

$$\frac{dT_{out}}{dt} + \left[\frac{\dot{m}_{oil}}{\rho_{oil} V_{oil}} + \frac{h_{oil} A}{\rho_{oil} V_{oil} cp_{oil}}\right] T_{out} = \left[\frac{\Delta \dot{W}}{\rho_{oil} V_{oil} cp_{oil}} + \frac{\dot{m}_{oil} T_{in}}{\rho_{oil} V_{oil}}\right] + \left[\frac{h_{oil} A}{\rho_{oil} V_{oil} cp_{oil}}\right] T_{steel} \quad (5)$$

Terms $\alpha$, $\beta$ and $\delta$ are provided as:

$$\alpha = \frac{\dot{m}_{oil}}{\rho_{oil} V_{oil}} + \frac{h_{oil} A}{\rho_{oil} V_{oil} cp_{oil}} \quad (6)$$

$$\beta = \frac{\Delta \dot{W}}{\rho_{oil} V_{oil} cp_{oil}} + \frac{\dot{m}_{oil} T_{in}}{\rho_{oil} V_{oil}} \quad (7)$$

$$\delta = \frac{h_{oil} A}{\rho_{oil} V_{oil} cp_{oil}} \quad (8)$$

$T_{shell}$ is used to solve for $T_{out}$ (i.e., stator temperature) and is determined based on an energy balance from the torque converter shell 28 to the surroundings as illustrated in FIG. 3. The resulting equation from the energy balance is provided as:

$$\dot{Q}_{shell} - \dot{Q}_{surr} = m_{shell} cp_{shell} \frac{dT_{shell}}{dt} \quad (9)$$

where:

$m_{shell}$ is the mass of the torque converter shell; and $cp_{shell}$ is the specific heat of the shell (dependent on shell material).

Losses to the environment due to convection of heat from the shell 28 to the atmosphere are represented as:

$$\dot{Q}_{surr} = h_{air} A (T_{shell} - T_{air}) \quad (10)$$

where:

$h_{air}$ is the heat transfer coefficient of air.

By substituting Equation 2 and Equation 10 into Equation 9 and rearranging, the following differential equation is provided:

$$\frac{dT_{shell}}{dt} + \left[\frac{(h_{oil}A + h_{air}A)}{m_{shell} cp_{shell}}\right] T_{shell} = \left[\frac{h_{oil}A}{m_{shell} cp_{shell}}\right] T_{out} + \left[\frac{h_{air} A T_{air}}{m_{shell} cp_{shell}}\right] \quad (11)$$

Terms $\gamma$, $\eta$ and $\epsilon$ are provided as:

$$\gamma = \frac{(h_{oil}A + h_{air}A)}{m_{shell} cp_{shell}} \quad (12)$$

$$\eta = \frac{h_{oil}A}{m_{shell} cp_{shell}} \quad (13)$$

$$\varepsilon = \frac{h_{air} A T_{air}}{m_{shell} cp_{shell}} \quad (14)$$

From inspection of Equation 5 and Equation 11, it is apparent that in order to solve for $T_{out}$, both first order differential equations must be solved for simultaneously. The reduced matrix form for solving the system of equations is provided as:

$$\begin{bmatrix} \dot{T}_{shell} \\ \dot{T}_{out} \end{bmatrix} = \begin{bmatrix} -\gamma & \eta \\ \delta & -\alpha \end{bmatrix} \begin{bmatrix} T_{shell} \\ T_{out} \end{bmatrix} + \begin{bmatrix} \varepsilon \\ \beta \end{bmatrix} \quad (15)$$

There is difficulty in solving this system of differential equations using direct methods. There are two separate heat fluxes occurring simultaneously (from the oil 30 to the shell 28 and from the shell 28 to the air) and both are dependent upon each other. Therefore, $$\frac{dT_{shell}}{dt}$$

and $$\frac{dT_{out}}{dt}$$

are solved in iterations within the model using a time step of one second. This eliminates the dependency on time for both equations and enable a less difficult approach to solving.

Figure 4A:
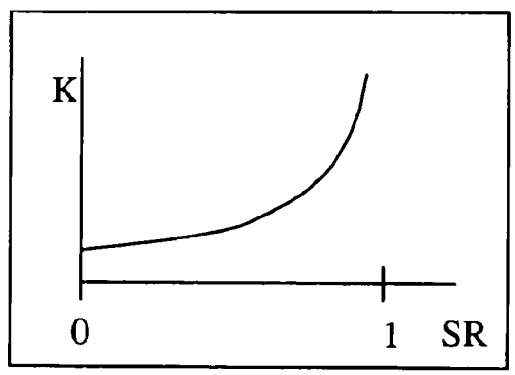
FIGS. 4A and 4B illustrates an exemplary K-factor graph and an exemplary torque ratio graph, respectively, each based on a speed ratio.
Figure 4B:
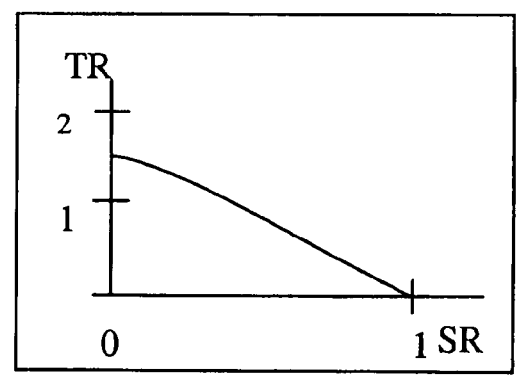

Torque converter work loss is also determined based on speed ratio (SR), input torque ($\tau_{in}$) and output torque ($\tau_{out}$). In order to calculate $\tau_{in}$ and $\tau_{out}$, the following assumption is made: the torque converter behavior can be represented from use of empirically derived characteristics. The characteristics include torque converter K-factor and torque ratio (TR), both of which are functions of SR as illustrated in FIGS. 4A and 4B. The following equations are used to determine SR, $\tau_{in}$ and $\tau_{out}$, respectively:

$$SR = \frac{N_{turb}}{N_{pump}} \quad (16)$$

$$\tau_{in} = \left[\frac{N_{pump}}{K_{in}}\right]^2 \quad (17)$$

$$\tau_{out} = \tau_{in} TR \quad (18)$$

where:

$N_{turb}$ is the turbine speed;

$N_{pump}$ is the pump speed; and $K_{in}$ is the K-factor ($N_{pump}$ divided by $\sqrt{\tau_{in}}$).

$\tau_{in}$ is calculated from pump speed (i.e., engine speed) and K-factor. $\tau_{out}$ is calculated from $\tau_{in}$ and the known torque ratio (TR) characteristics for the torque converter 14. By implementing these relationships, the power loss across the torque converter 14 is determined as:

$$\Delta \dot{W} = \dot{W}_{in} - \dot{W}_{out} = \frac{N_{pump} \tau_{in}}{9549} - \frac{N_{turb} \tau_{out}}{9549} \quad (19)$$

The fluid flow rate (i.e., oil mass flow rate) through the torque converter 14 is also determined. In order to understand the mass flow rate of oil through the torque converter 14, line pressure and engine speed are each considered. More particularly oil mass flow rate is determined from a look-up table based on line pressure and engine speed. The look-up table is calibrated for the particular transmission type and is based on empirical data.

Heat transfer coefficients of the air ($h_{air}$) and for the oil ($h_{oil}$) are based on a transmission thermal model, a detailed description of which is beyond the scope of the present discussion. The $h_{oil}$ is also based on the locked or unlocked state of the TCC. The following equations are used to determine the heat transfer coefficients:

$$h_{air} = 200 \left[\frac{NE}{1500}\right]^{0.8} \quad (20)$$

$$h_{oil} = \frac{20}{SR} \quad (TCC \text{ Unlocked}) \quad (21)$$

$$h_{oil} = 5.0 \quad (TCC \text{ Locked}) \quad (22)$$

Figure 5:
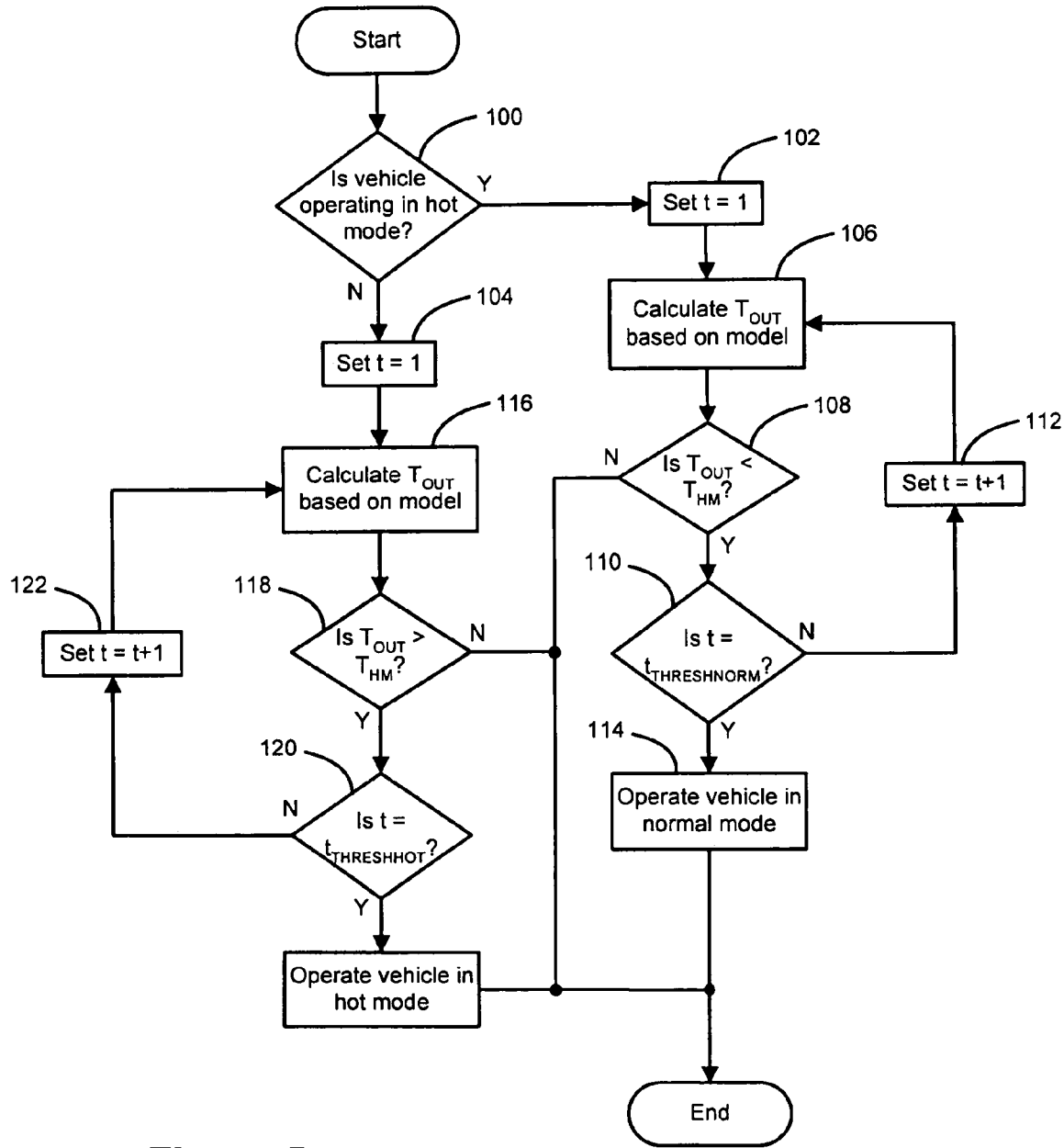
FIG. 5 is a flowchart illustrating cooling control according to the present invention.

Referring now to FIG. 5, the cooling control of the present invention will be described in detail. In step 100, control determines whether the vehicle 10 is operating in hot mode. If the vehicle 10 is operating in hot mode, control continues in step 102. If the vehicle 10 is not operating in hot mode, control continues in step 104.

Control sets a timer equal to one (t=1) in step 102. In step 106 control calculates $T_{out}$. More particularly, control initially calculates a present $T_{shell}$ based on the previous $T_{out}$ and calculates the present $T_{out}$ based on the present $T_{shell}$. In step 108, control determines whether the present $T_{out}$ is less than a hot mode temperature threshold ($T_{HM}$). If $T_{out}$ is less than $T_{HM}$, control continues in step 110. If $T_{out}$ is not less than $T_{HM}$, the vehicle is to remain in hot mode and control ends.

Control determines whether the timer has achieved a timer threshold for entering normal mode ($t_{THRESHNORM}$) in step 110. If the timer has not achieved $t_{THRESHNORM}$, control continues in step 112. If the timer has achieved $t_{THRESHNORM}$, control continues in step 114. In step 112, control increases the timer by one iteration and control continues in step 106. In step 114, $T_{out}$ has been less than $T_{HM}$ for a sufficient time period. Therefore, control operates the vehicle in normal mode and control ends. In this manner, control ensures that $T_{out}$ is above $T_{HM}$ for a threshold time period before switching from hot mode to normal mode.

In step 104, control sets a timer equal to one (t=1). Control calculates $T_{out}$ based on the model as described above in step 116. In step 118, control determines whether $T_{out}$ is greater than $T_{HM}$. If $T_{out}$ is not greater than $T_{HM}$, control ends. If $T_{out}$ is greater than $T_{HM}$, control determines whether the timer is equal to a threshold for entering the hot mode ($t_{THRESHHOT}$) in step 120. If the timer is not equal to $t_{THRESHHOT}$, control continues in step 122. If the timer is equal to $t_{THRESHHOT}$, control continues in step 124. In step 122, control increments the timer by one iteration and continues in step 116. In step 124, control operates the vehicle in hot mode and control ends. In this manner, control ensures that $T_{out}$ is below $T_{HM}$ for a threshold time period before switching to hot mode.

Figure 6:
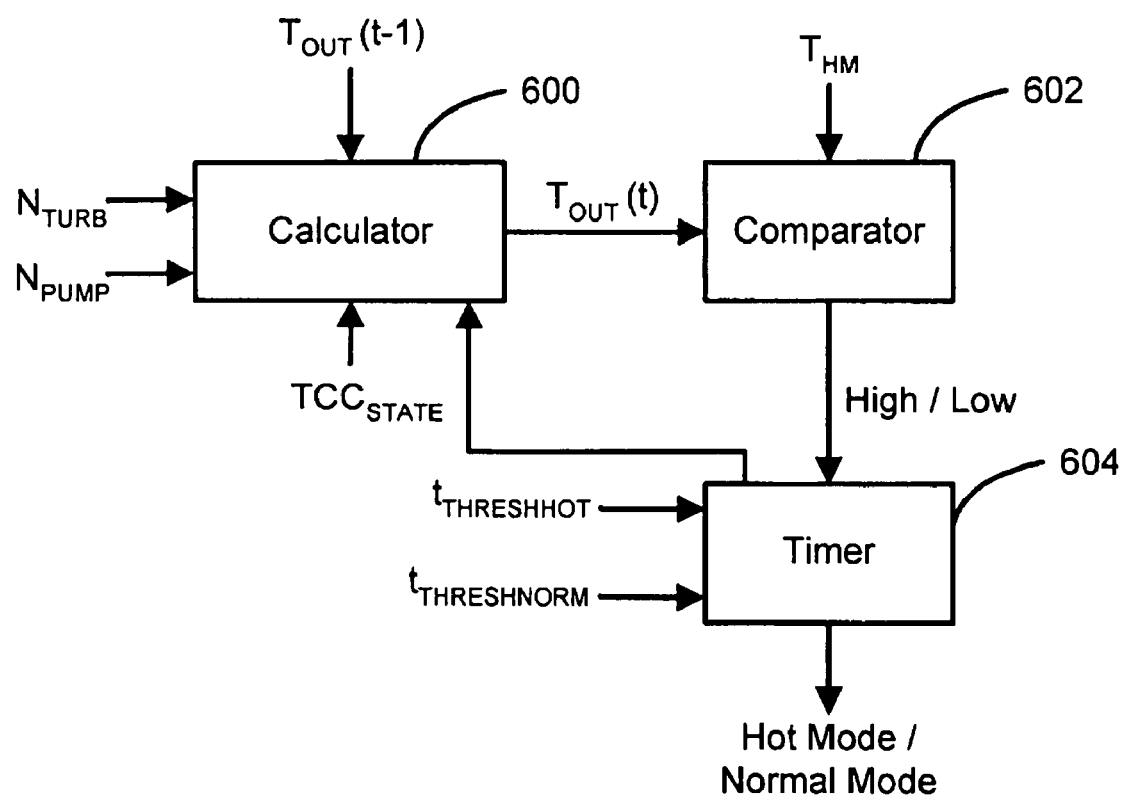
FIG. 6 is a logic flow of the cooling control.

Referring now to FIG. 6, a logic flow of the cooling control is illustrated. A calculator 600 calculates the present $T_{shell}$ based on the prior $T_{out}$, $N_{turb}$, $N_{pump}$ and a TCC state ($TCC_{STATE}$) (e.g., locked or unlocked). The calculator calculates the present Tu, based on the present $T_{SHELL}$. A comparator 602 receives the present $T_{out}$ and $T_{HM}$ as inputs and compares $T_{out}$ to $T_{HM}$. If $T_{out}$ is greater than $T_{HM}$, the comparator 602 sends a high signal to a timer 604. If $T_{out}$ is not greater than $T_{HM}$, the comparator 602 sends a low signal to the timer 604. The timer 604 also includes $t_{THRESHHOT}$ and $t_{THRESHNORM}$ as inputs.

The timer 604 monitors the duration of the high signal and the low signal. For example, if the high signal is continuously input from the comparator 602 for a time greater than $t_{THRESHHOT}$, the timer outputs a hot mode signal to initialize hot mode entry. If the low signal is continuously input from the comparator 602 for a time greater than $t_{THRESHNORM}$, the timer outputs a normal mode signal to initialize normal mode entry. If either signal is received for less than their respective threshold times, the timer outputs a signal to the calculator 600 to recalculate $T_{out}$ for the next time step.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system that generates one of a normal mode and a hot mode signal to control operation of a transmission, comprising:
   a calculator calculates a predicted temperature of a torque converter;
   a comparator that compares said predicted temperature to a threshold temperature; and
   a timer that generates one of said normal mode and said hot mode signals based on said predicted temperature and said threshold temperature.

2. The control system of claim 1 wherein said hot mode signal is generated when said predicted temperature is greater than said threshold temperature for a threshold time.

3. The control system of claim 1 wherein said normal mode signal is generated when said predicted temperature is lower than said threshold temperature for a threshold time.

4. The control system of claim 1 further comprising a controller that operates said transmission to reduce slipping of said torque converter based on said hot mode signal.

5. The control system of claim 1 wherein said calculator calculates said predicted temperature based on work loss through said torque converter, flow rate through said torque converter, a heat transfer coefficient for air and a heat transfer coefficient for oil flowing through said torque converter.

6. The control system of claim 5 wherein said calculator calculates said work loss based on a speed ratio, an input torque into said torque converter and an output torque from said torque converter.

7. The control system of claim 6 wherein said calculator calculates said speed ratio based on an engine speed signal and a transmission speed signal.

8. The control system of claim 6 wherein said calculator calculates said input torque based on an engine speed signal and a K-factor.

9. The control system of claim 8 wherein said K-factor is determined from a look-up table based on said speed ratio.

10. The control system of claim 6 wherein said output torque is based on said input torque and a torque ratio.

11. The control system of claim 10 wherein said torque ratio is determined from a look-up table based on said speed ratio.

12. The control system of claim 5 wherein said calculator determines said flow rate from a look-up table based on a line pressure signal and an engine speed signal.

13. The control system of claim 5 wherein said calculator calculates said heat transfer coefficient of air based on a speed ratio and a locked state of a torque converter clutch.

14. A control system that operates a transmission in one of a normal mode and a hot mode, comprising:
   a torque converter that transfers drive torque from an engine to said transmission; and
   a controller that calculates a predicted temperature of said torque converter based on a thermal model of said torque converter, that compares said predicted temperature to a threshold temperature and that operates said transmission in one of said normal mode and said hot mode based on said predicted temperature and said threshold temperature.

15. The control system of claim 14 wherein said transmission is operated in said hot mode when said predicted temperature is greater than said threshold temperature for a threshold time.

16. The control system of claim 14 wherein said controller operates said transmission from said hot mode to said normal mode when said predicted temperature is lower than said threshold temperature for a threshold time.

17. The control system of claim 14 wherein when in said hot mode said controller operates said transmission to reduce slipping of said torque converter.

18. The control system of claim 14 wherein said thermal model is based on work loss through said torque converter, flow rate through said torque converter, a heat transfer coefficient for air and a heat transfer coefficient for oil flowing through said torque converter.

19. The control system of claim 18 further comprising calculating said work loss based on a speed ratio, an input torque into said torque converter and an output torque from said torque converter.

20. The control system of claim 19 further comprising:
an engine speed sensor that generates an engine speed signal;
a transmission speed sensor that generates a transmission speed signal; and
wherein said speed ratio is calculated based on a said engine speed signal and said transmission speed signal.

21. The control system of claim 19 further comprising an engine speed sensor that generates an engine speed signal, wherein said input torque is based on said engine speed signal and a K-factor.

22. The control system of claim 21 wherein said K-factor is determined from a look-up table based on said speed ratio.

23. The control system of claim 19 wherein said output torque is based on said input torque and a torque ratio.

24. The control system of claim 23 wherein said torque ratio is determined from a look-up table based on said speed ratio.

25. The control system of claim 18 further comprising:
a pressure sensor that generates a line pressure signal;
an engine speed sensor that generates an engine speed signal; and
wherein said flow rate is determined from a look-up table based on said line pressure signal and said engine speed signal.

26. The control system of claim 18 further comprising a torque converter clutch that is operable in a locked mode and an unlocked mode, wherein said heat transfer coefficient of air is determined based on a speed ratio and a mode of said torque converter clutch.

27. A method of cooling a torque converter of a transmission that is operable in a first mode and a second mode, comprising:
calculating a predicted temperature of said torque converter based on a thermal model of said torque converter while said transmission is operating in said first mode;
comparing said predicted temperature to a threshold temperature; and
operating said transmission in one of said first mode and said second mode based on said predicted temperature and said threshold temperature.

28. The method of claim 27 wherein said transmission is operated in said second mode when said predicted temperature is greater than said threshold temperature for a threshold time.

29. The method of claim 27 further comprising switching operation of said transmission from said second mode to said first mode when said predicted temperature is lower than said threshold temperature for a threshold time.

30. The method of claim 27 wherein when in said second mode said transmission is operated to reduce slipping of said torque converter.

31. The method of claim 27 wherein said thermal model is based on work loss through said torque converter, flow rate through said torque converter, a heat transfer coefficient for air and a heat transfer coefficient for oil flowing through said torque converter.

32. The method of claim 31 further comprising calculating said work loss based on a speed ratio, an input torque into said torque converter and an output torque from said torque converter.

33. The method of claim 32 further comprising calculating said speed ratio based on a pump speed and a turbine speed.

34. The method of claim 33 further comprising calculating said input torque based on a pump speed and a K-factor.

35. The method of claim 34 wherein said K-factor is determined from a look-up table based on said speed ratio.

36. The method of claim 32 further comprising calculating said output torque based on said input torque and a torque ratio.

37. The method of claim 36 wherein said torque ratio is determined from a look-up table based on said speed ratio.

38. The method of claim 31 wherein said flow rate is determined from a look-up table based on transmission line pressure and engine speed.

39. The method of claim 31 wherein said heat transfer coefficient of air is determined based on a speed ratio and a state of a torque converter clutch.

40. A vehicle operable in one of a normal mode and a hot mode, comprising:
a transmission;
a torque converter that transfers drive torque from an engine to said transmission; and
a controller that calculates a predicted temperature of said torque converter based on a thermal model of said torque converter, that compares said predicted temperature to a threshold temperature and that operates said vehicle in said hot mode if said predicted temperature is greater than said threshold temperature for a first threshold time period.

41. The vehicle of claim 40 wherein said controller switches operation of said vehicle from said hot mode to said normal mode if said predicted temperature is less than said threshold temperature a second threshold time period.

42. The vehicle of claim 40 wherein when in said hot mode said controller operates said transmission to reduce slipping of said torque converter.

43. The vehicle of claim 40 wherein said thermal model is based on work loss through said torque converter, flow rate through said torque converter, a heat transfer coefficient for air and a heat transfer coefficient for oil flowing through said torque converter.

44. The vehicle of claim 43 further comprising calculating said work loss based on a speed ratio, an input torque into said torque converter and an output torque from said torque converter.

45. The vehicle of claim 44 further comprising:
an engine speed sensor that generates an engine speed signal;
a transmission speed sensor that generates a transmission speed signal; and
wherein said speed ratio is calculated based on a said engine speed signal and said transmission speed signal.

46. The vehicle of claim 44 further comprising an engine speed sensor that generates an engine speed signal, wherein said input torque is based on said engine speed signal and a K-factor.

47. The vehicle of claim 46 wherein said K-factor is determined from a look-up table based on said speed ratio.

48. The vehicle of claim 44 wherein said output torque is based on said input torque and a torque ratio.

49. The vehicle of claim 48 wherein said torque ratio is determined from a look-up table based on said speed ratio.

50. The vehicle of claim 43 further comprising:
  a pressure sensor that generates a line pressure signal;
  an engine speed sensor that generates an engine speed signal; and
  wherein said flow rate is determined from a look-up table based on said line pressure signal and said engine speed signal.

51. The vehicle of claim 43 further comprising a torque converter clutch that is operable in a locked mode and an unlocked mode, wherein said heat transfer coefficient of air is determined based on a speed ratio and a mode of said torque converter clutch.

* * * * *